(12) United States Patent
Voros

(10) Patent No.: US 9,434,284 B2
(45) Date of Patent: Sep. 6, 2016

(54) THERMOSTAT DEVICE

(71) Applicant: W.E.T. Automotive Systems AG, Odelzhausen (DE)

(72) Inventor: Gabor Voros, Telki (HU)

(73) Assignee: GENTHERM GMBH, Odelzhausen (DE)

(*) Notice: Subject to any disclaimer, the term of this patent is extended or adjusted under 35 U.S.C. 154(b) by 856 days.

(21) Appl. No.: 13/675,444

(22) Filed: Nov. 13, 2012

(65) Prior Publication Data

US 2013/0126147 A1    May 23, 2013

(30) Foreign Application Priority Data

Nov. 17, 2011 (DE) .................. 10 2011 118 774
Dec. 26, 2011 (DE) .................. 10 2011 121 978
Oct. 24, 2012 (DE) .................. 10 2012 020 848

(51) Int. Cl.
*B60N 2/56* (2006.01)
*G05D 23/19* (2006.01)

(52) U.S. Cl.
CPC ........... *B60N 2/5685* (2013.01); *B60N 2/5692* (2013.01); *G05D 23/1919* (2013.01)

(58) Field of Classification Search
CPC ............. B60N 2/5685; B60N 2/5692; G05D 23/1919
USPC ........................ 165/203; 297/180.12, 180.1
See application file for complete search history.

(56) References Cited

U.S. PATENT DOCUMENTS

| | | | |
|---|---|---|---|
| 1,370,832 A | 3/1921 | Mollberg |
| 1,439,681 A | 12/1922 | Alkire et al. |
| 1,514,329 A | 11/1924 | Metcalf |
| 2,022,959 A | 12/1935 | Gordon |
| 2,158,801 A | 5/1939 | Petterson |
| 2,493,303 A | 1/1950 | McCullough |
| 2,703,134 A | 3/1955 | Mossor |
| 2,758,532 A | 8/1956 | Awe |
| 2,782,834 A | 2/1957 | Vigo |
| 2,791,956 A | 5/1957 | Guest |
| 2,826,135 A | 3/1958 | Benzick |

(Continued)

FOREIGN PATENT DOCUMENTS

| | | |
|---|---|---|
| DE | 37 05 756 | 10/1988 |
| DE | 10144839 | 3/2003 |

(Continued)

OTHER PUBLICATIONS

Excerpt from website http://www.seatcomfort.com/ventilation.htm, Specializing in Seat Ventilation and Heating Systems, Ventilation.

(Continued)

*Primary Examiner* — Tho V Duong
*Assistant Examiner* — Raheena Rehman
(74) *Attorney, Agent, or Firm* — The Dobrusin Law Firm, P.C.

(57) ABSTRACT

The present invention relates to a temperature control device with at least one heat source and, additionally or alternatively, a heat sink and with at least one temperature detector for monitoring the temperature of the temperature control device. It is provided that the temperature control device comprises a sensor temperature control device that can be selectably switched on in order to additionally temper the temperature detector at least in some operating stages.

20 Claims, 1 Drawing Sheet

(56) References Cited

U.S. PATENT DOCUMENTS

| | | |
|---|---|---|
| 2,992,604 A | 7/1961 | Trotman et al. |
| 2,992,605 A | 7/1961 | Trotman et al. |
| 3,030,145 A | 4/1962 | Kottemann |
| 3,101,037 A | 8/1963 | Taylor |
| 3,101,660 A | 8/1963 | Taylor |
| 3,127,931 A | 4/1964 | Johnson |
| 3,131,967 A | 5/1964 | Spaulding |
| 3,136,577 A | 6/1964 | Richard |
| 3,162,489 A | 12/1964 | Trotman |
| 3,209,380 A | 10/1965 | Watsky |
| 3,486,177 A | 12/1969 | Marshack |
| 3,529,310 A | 9/1970 | Olmo |
| 3,550,523 A | 12/1970 | Segal |
| 3,653,590 A | 4/1972 | Elsea |
| 3,681,797 A | 8/1972 | Messner |
| 3,684,170 A | 8/1972 | Roof |
| 3,736,022 A | 5/1973 | Radke |
| 3,738,702 A | 6/1973 | Jacobs |
| 3,757,366 A | 9/1973 | Sacher |
| 3,770,318 A | 11/1973 | Fenton |
| 3,778,851 A | 12/1973 | Howorth |
| 3,948,246 A | 4/1976 | Jenkins |
| 4,002,108 A | 1/1977 | Drori |
| 4,043,544 A | 8/1977 | Ismer |
| 4,060,276 A | 11/1977 | Lindsay |
| 4,072,344 A | 2/1978 | Li |
| 4,141,585 A | 2/1979 | Blackman |
| 4,259,896 A | 4/1981 | Hayashi et al. |
| 4,413,857 A | 11/1983 | Hayashi |
| 4,509,792 A | 4/1985 | Wang |
| 4,572,430 A | 2/1986 | Takagi et al. |
| 4,589,656 A | 5/1986 | Baldwin |
| 4,665,707 A | 5/1987 | Hamilton |
| 4,685,727 A | 8/1987 | Cremer et al. |
| 4,712,832 A | 12/1987 | Antolini et al. |
| 4,729,598 A | 3/1988 | Hess |
| 4,777,802 A | 10/1988 | Feher |
| 4,847,933 A | 7/1989 | Bedford |
| 4,853,992 A | 8/1989 | Yu |
| 4,866,800 A | 9/1989 | Bedford |
| 4,905,475 A | 3/1990 | Tuomi |
| 4,923,248 A | 5/1990 | Feher |
| 4,946,220 A | 8/1990 | Wyon et al. |
| 4,981,324 A | 1/1991 | Law |
| 4,997,230 A | 3/1991 | Spitalnick |
| 5,002,336 A | 3/1991 | Feher |
| 5,004,294 A | 4/1991 | Lin |
| 5,016,302 A | 5/1991 | Yu |
| 5,102,189 A | 4/1992 | Saito et al. |
| 5,106,161 A | 4/1992 | Meiller |
| 5,117,638 A | 6/1992 | Feher |
| 5,138,851 A | 8/1992 | Mardikian |
| 5,160,517 A | 11/1992 | Hicks et al. |
| 5,187,943 A | 2/1993 | Taniguchi et al. |
| 5,211,697 A | 5/1993 | Kienlein et al. |
| 5,226,188 A | 7/1993 | Liou |
| 5,229,579 A | 7/1993 | Ingraham et al. |
| 5,292,577 A | 3/1994 | Van Kerrebrouck et al. |
| 5,354,117 A | 10/1994 | Danielson et al. |
| 5,370,439 A | 12/1994 | Lowe et al. |
| 5,372,402 A | 12/1994 | Kuo |
| 5,382,075 A | 1/1995 | Shih |
| 5,385,382 A | 1/1995 | Single, II et al. |
| 5,403,065 A | 4/1995 | Callerio |
| 5,408,711 A | 4/1995 | McClelland |
| 5,411,318 A | 5/1995 | Law |
| 5,416,935 A | 5/1995 | Nieh |
| 5,450,894 A | 9/1995 | Inoue et al. |
| 5,524,439 A | 6/1996 | Gallup et al. |
| 5,561,875 A | 10/1996 | Graebe |
| 5,590,428 A | 1/1997 | Roter |
| 5,597,200 A | 1/1997 | Gregory et al. |
| 5,613,729 A | 3/1997 | Summer, Jr. |
| 5,613,730 A | 3/1997 | Buie et al. |
| 5,626,021 A | 5/1997 | Karunasiri et al. |
| 5,626,386 A | 5/1997 | Lush |
| 5,626,387 A | 5/1997 | Yeh |
| 5,645,314 A | 7/1997 | Liou |
| 5,692,952 A | 12/1997 | Chih-Hung |
| 5,701,621 A | 12/1997 | Landi et al. |
| 5,715,695 A | 2/1998 | Lord |
| 5,787,534 A | 8/1998 | Hargest et al. |
| 5,833,309 A | 11/1998 | Schmitz |
| 5,833,321 A | 11/1998 | Kim et al. |
| 5,847,911 A | 12/1998 | Van Reenen et al. |
| 5,887,304 A | 3/1999 | Von der Heyde |
| 5,902,014 A | 5/1999 | Dinkel et al. |
| 5,918,930 A | 7/1999 | Kawai et al. |
| 5,921,100 A | 7/1999 | Yoshinori et al. |
| 5,921,314 A | 7/1999 | Schuller et al. |
| 5,921,858 A | 7/1999 | Kawai et al. |
| 5,924,766 A | 7/1999 | Esaki et al. |
| 5,924,767 A | 7/1999 | Pietryga |
| 5,927,817 A | 7/1999 | Ekman et al. |
| 5,934,748 A | 8/1999 | Faust et al. |
| 6,003,950 A | 12/1999 | Larsson |
| 6,019,420 A | 2/2000 | Faust et al. |
| 6,048,024 A | 4/2000 | Wallman |
| 6,059,018 A | 5/2000 | Yoshinori et al. |
| 6,062,641 A | 5/2000 | Suzuki et al. |
| 6,064,037 A | 5/2000 | Weiss et al. |
| 6,068,332 A | 5/2000 | Faust et al. |
| 6,079,485 A | 6/2000 | Esaki et al. |
| 6,085,369 A | 7/2000 | Feher |
| 6,105,667 A | 8/2000 | Yoshinori et al. |
| 6,109,688 A | 8/2000 | Wurz et al. |
| 6,124,577 A * | 9/2000 | Fristedt ........... A47C 7/748 |
| | | 219/202 |
| 6,145,925 A | 11/2000 | Eksin et al. |
| 6,164,719 A * | 12/2000 | Rauh ................ A47C 7/74 |
| | | 297/180.1 |
| 6,179,706 B1 | 1/2001 | Yoshinori et al. |
| 6,186,592 B1 | 2/2001 | Orizaris et al. |
| 6,189,966 B1 | 2/2001 | Faust et al. |
| 6,196,627 B1 | 3/2001 | Faust et al. |
| 6,224,150 B1 | 5/2001 | Eksin et al. |
| 6,237,675 B1 | 5/2001 | Oehring et al. |
| 6,254,179 B1 | 7/2001 | Kortume et al. |
| 6,263,530 B1 | 7/2001 | Feher |
| 6,273,810 B1 | 8/2001 | Rhodes et al. |
| 6,277,023 B1 | 8/2001 | Schwartz |
| 6,278,090 B1 | 8/2001 | Fristedt et al. |
| 6,291,803 B1 | 9/2001 | Fourrey |
| 6,478,369 B1 | 11/2002 | Aoki et al. |
| 6,481,801 B1 | 11/2002 | Schmale |
| 6,491,578 B2 | 12/2002 | Yoshinori et al. |
| 6,497,275 B1 | 12/2002 | Elliot |
| 6,505,886 B2 | 1/2003 | Gielda et al. |
| 6,511,125 B1 | 1/2003 | Gendron |
| 6,541,737 B1 | 4/2003 | Eksin et al. |
| RE38,128 E | 6/2003 | Gallup et al. |
| 6,578,910 B2 | 6/2003 | Andersson et al. |
| 6,592,181 B2 | 7/2003 | Stiller et al. |
| 6,598,405 B2 | 7/2003 | Bell |
| 6,604,785 B2 | 8/2003 | Bargheer et al. |
| 6,619,736 B2 | 9/2003 | Stowe et al. |
| 6,626,488 B2 | 9/2003 | Pfahler |
| 6,629,724 B2 | 10/2003 | Ekern et al. |
| 6,629,725 B1 | 10/2003 | Kunkel et al. |
| 6,664,518 B2 | 12/2003 | Fristedt et al. |
| 6,676,207 B2 | 1/2004 | Rauh et al. |
| 6,682,140 B2 | 1/2004 | Minuth et al. |
| 6,685,553 B2 | 2/2004 | Aoki |
| 6,687,937 B2 | 2/2004 | Harker |
| 6,719,534 B2 | 4/2004 | Aoki |
| 6,719,624 B2 | 4/2004 | Hayashi et al. |
| 6,722,148 B2 | 4/2004 | Aoki et al. |
| 6,761,399 B2 | 7/2004 | Bargheer et al. |
| 6,767,621 B2 | 7/2004 | Flick et al. |
| 6,786,541 B2 | 9/2004 | Haupt et al. |
| 6,786,545 B2 | 9/2004 | Bargheer et al. |
| 6,793,016 B2 | 9/2004 | Aoki et al. |
| 6,808,230 B2 | 10/2004 | Buss et al. |
| 6,817,675 B2 | 11/2004 | Buss et al. |

(56) References Cited

U.S. PATENT DOCUMENTS

| | | |
|---|---|---|
| 6,826,792 B2 | 12/2004 | Lin |
| 6,828,528 B2 | 12/2004 | Stöwe et al. |
| 6,848,742 B1 | 2/2005 | Aoki et al. |
| 6,857,697 B2 | 2/2005 | Brennan et al. |
| 6,869,139 B2 | 3/2005 | Brennan et al. |
| 6,869,140 B2 | 3/2005 | White et al. |
| 6,871,696 B2 | 3/2005 | Aoki et al. |
| 6,886,352 B2 | 5/2005 | Yoshinori et al. |
| 6,892,807 B2 | 5/2005 | Fristedt et al. |
| 6,893,086 B2 | 5/2005 | Bajic et al. |
| 6,929,322 B2 | 8/2005 | Aoki et al. |
| 6,957,545 B2 | 10/2005 | Aoki |
| 6,976,734 B2 | 12/2005 | Stoewe |
| 7,013,653 B2 | 3/2006 | Kamiya et al. |
| 7,040,710 B2 | 5/2006 | White et al. |
| 7,052,091 B2 | 5/2006 | Bajic et al. |
| 7,070,232 B2 | 7/2006 | Minegishi et al. |
| 7,083,227 B2 | 8/2006 | Brennan et al. |
| 7,114,771 B2 | 10/2006 | Lofy et al. |
| 7,131,689 B2 | 11/2006 | Brennan et al. |
| 7,147,279 B2 | 12/2006 | Bevan et al. |
| 7,168,758 B2 | 1/2007 | Bevan et al. |
| 7,183,519 B2 * | 2/2007 | Horiyama ............... B62J 33/00 219/202 |
| 7,338,117 B2 | 3/2008 | Iqbal et al. |
| 7,356,912 B2 | 4/2008 | Iqbal et al. |
| 7,370,911 B2 | 5/2008 | Bajic et al. |
| 7,827,805 B2 | 11/2010 | Comiskey |
| 7,873,451 B2 * | 1/2011 | Hartmann ............ B60H 1/2218 454/120 |
| 2004/0195870 A1 | 10/2004 | Bohlender et al. |
| 2005/0066505 A1 | 3/2005 | Iqbal et al. |
| 2005/0067862 A1 | 3/2005 | Iqbal et al. |
| 2005/0093347 A1 | 5/2005 | Bajic et al. |
| 2005/0140189 A1 | 6/2005 | Bajic et al. |
| 2005/0173950 A1 | 8/2005 | Bajic et al. |
| 2005/0200166 A1* | 9/2005 | Noh ..................... B60N 2/5642 297/180.14 |
| 2005/0200179 A1 | 9/2005 | Bevan et al. |
| 2005/0257541 A1 | 11/2005 | Kadle et al. |
| 2006/0138810 A1 | 6/2006 | Knoll et al. |
| 2006/0152044 A1 | 7/2006 | Bajic et al. |
| 2006/0158011 A1 | 7/2006 | Marlovits et al. |
| 2007/0001507 A1 | 1/2007 | Brennan et al. |
| 2007/0176471 A1 | 8/2007 | Knoll |
| 2007/0278210 A1* | 12/2007 | Weiss ................... B60N 2/5685 219/508 |
| 2008/0111403 A1* | 5/2008 | Ulbrich ................ B60N 2/5628 297/180.12 |
| 2008/0191520 A1* | 8/2008 | Hartmann ............ B60N 2/5635 297/180.12 |
| 2008/0238159 A1* | 10/2008 | Parnis .................. B60N 2/5685 297/180.12 |
| 2009/0032518 A1* | 2/2009 | Ohashi ................. B60N 2/5685 219/202 |
| 2009/0095725 A1* | 4/2009 | Ohashi ................. B60N 2/5685 219/202 |
| 2009/0295199 A1* | 12/2009 | Kincaid ................ A47C 7/748 297/180.12 |
| 2010/0327636 A1 | 12/2010 | Stoll et al. |
| 2011/0147357 A1* | 6/2011 | Bokelmann .......... B60N 2/5685 219/202 |
| 2011/0221242 A1* | 9/2011 | Juric .................... B60N 2/5635 297/180.1 |
| 2011/0240751 A1* | 10/2011 | Rauh ....................... B64D 13/00 236/91 D |
| 2011/0290785 A1* | 12/2011 | Schaeffer ............. B60N 2/5685 219/538 |
| 2012/0091112 A1* | 4/2012 | Wei ...................... B60N 2/5685 219/202 |
| 2013/0043320 A1* | 2/2013 | Zhang .................. B60N 2/5621 237/28 |
| 2013/0334202 A1* | 12/2013 | Li ........................... A61F 7/007 219/500 |

FOREIGN PATENT DOCUMENTS

| | | |
|---|---|---|
| EP | 0 280 213 | 8/1988 |
| EP | 1266794 | 12/2002 |
| EP | 1323573 | 7/2003 |
| SE | 0102983 | 3/2003 |
| WO | 96/05475 | 2/1996 |
| WO | 02/053410 | 7/2002 |
| WO | 2004/114513 A1 | 12/2004 |
| WO | 2005/021320 | 3/2005 |

OTHER PUBLICATIONS

GMT 830 Heating & Ventilation System, IGB Automotive Ltd., received by Assignee W.E.T. Automotive Systems, Jun. 2003.
Specializing in Seat Ventilation and Heating Systems, Seat Comfort Systems, http://www.seatcomfort.comsemashow1.htm, Jun. 10, 2003.

* cited by examiner

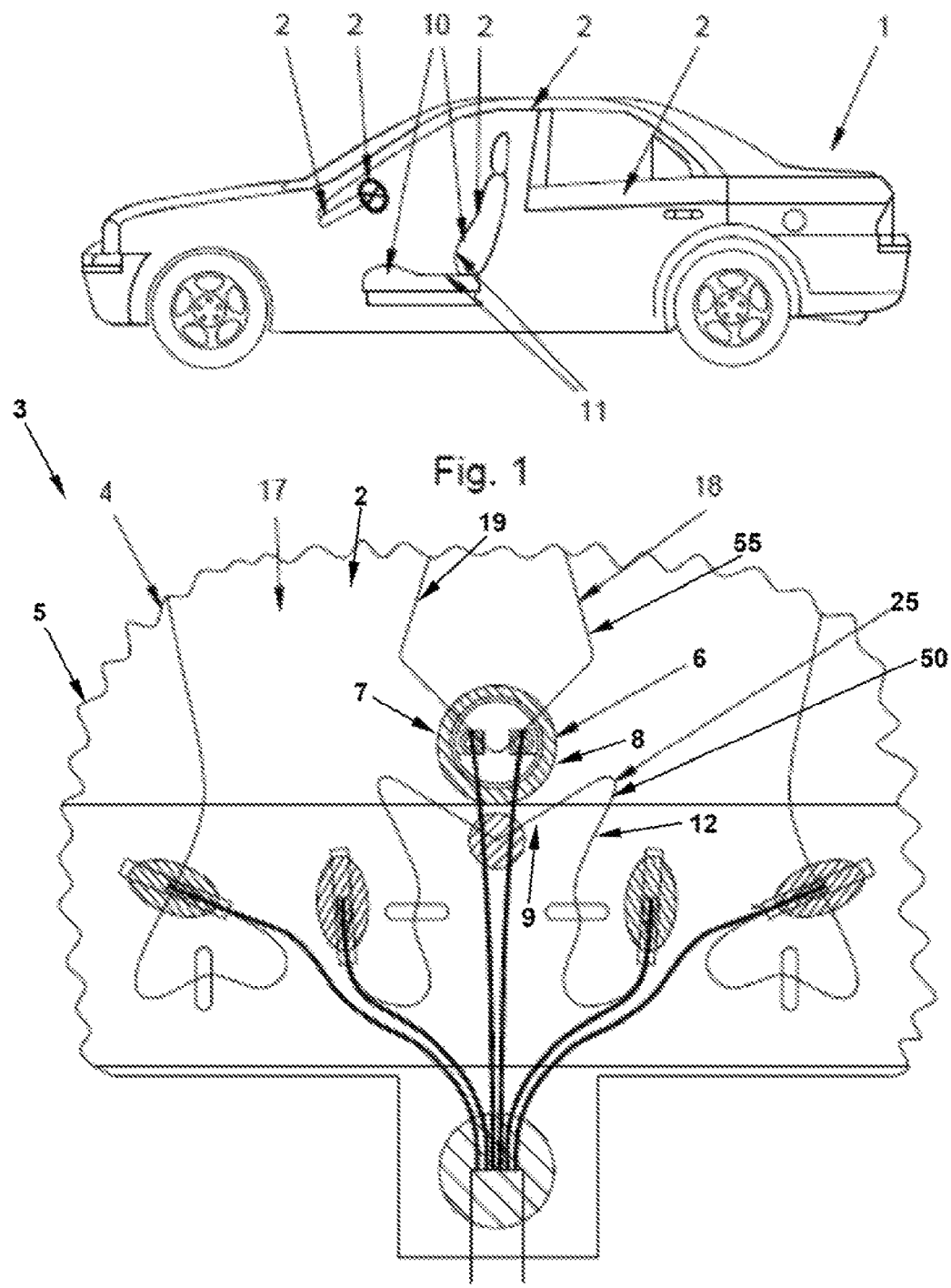

THERMOSTAT DEVICE

FIELD

The teachings relate to a temperature control device that comprises a sensor temperature control device that can be selectably switched on in order to additionally control the temperature detector at least in some operating stages.

SUMMARY

Details of the invention are explained in the following specification and in the claims. These explanations should make the invention understandable. However, they only have exemplary character. Of course, individual or several described features can also be omitted, modified or supplemented in the scope of the invention defined by the claims. Also, the features of different embodiments can of course be combined with each other. If a feature is to be met at least partially, this includes that this feature is also completely or substantially completely met. It is decisive that the change allows the object of the desired use to a recognizable extent, for example, in that a corresponding feature is met to at least 50%, 90%, 95% or 99%. If a minimum amount is indicated, even more than this minimum amount can of course be used. That which is described for an object can also be used for the predominate part or the totality of all other objects of the same type. In as far as nothing else is indicated, intervals also include their end points. The present application claims the benefit of DE 10 2011 118.774.3, filed on Nov. 17, 2011; DE 10 2011 121 978.5, filed on Dec. 26, 2011; and DE 10 2012 020 848.0, filed on Oct. 24, 2012, the contents of which are expressly incorporated by reference herein for all purposes.

One embodiment of the present teachings relates to a temperature control device with at least one heat source and, additionally or alternatively, a heat sink and with at least one temperature detector for monitoring the temperature of the temperature control device, characterized in that the temperature control device comprises a sensor temperature control device that can be selectably switched on in order to additionally temper the temperature detector at least in some operating stages.

Another embodiment of the present teachings relates to a method for operating a temperature control device with a temperature detector at least two different temperature stages, characterized in that in a first operating stage a heat source or a cooling device is in operation and its temperature is monitored by the temperature detector, and that in a second operating stage a sensor temperature control device is additionally switched on in order that another operating temperature is adjusted on the temperature control device and/or on the temperature detector than during the operation of the temperature control device without an additional control of the temperature detector.

BRIEF DESCRIPTION OF THE DRAWINGS

Reference is made in the following to:

FIG. 1 vehicle with a seat and temperature control device included in it.

FIG. 2 top view of a sensor of a control further development.

DETAILED DESCRIPTION

The present invention relates to a vehicle 1. The concept "vehicle" means in particular a device for transporting people and/or goods. For example, land vehicles, water vehicles track vehicles and aircrafts, especially airplanes, ships and automobile motor vehicles are conceivable.

The invention also relates to a climate control stretch 2. The words "climate control stretch" comprise in particular an object that should be influenced at least as regards at least one climate parameter, thus is subject to a control and/or regulation, in particular in order to bring it at least briefly to a certain theoretical value or into a theoretical range and/or to maintain it there permanently. This preferably applies to those parts of its surface with which a medium can come in contact in accordance with regulations or with which a user can come in contact with at least potentially when using the object. In particular, seats surfaces, steering wheels, control sticks or other structural elements with a support surface come into question.

Such a climate control stretch 2 comprises at least one temperature control device 3. "Temperature control device" means in particular a device that can be used for the purposeful changing of the temperature in its environment especially for adapting the temperature to a planar control zone. For example, heating devices 4, cooling devices 5, Peltier elements, heat conduction tubes and/or an air movement device such as, for example, a ventilator are conceivable. In many instances, it is advantageous if the temperature control device is designed for an operation with direct current and/or for an operating with low voltage, in particular for 12 V or 24 V.

In an appropriate manner at least one temperature control device 3 has at least in part one position that has a low thermal insulation relative to a zone to be tempered as a consequence. This makes possible a low consumption of energy and a rapid, effective heating. A temperature control device 3 can be arranged in particular on a padding 10 and covered by a covering 11.

At least one temperature control device 3 advantageously comprises at least one carrier 17. "Carrier" comprises in particular a device for mechanically relieving the load on a heating part and/or for fixing its spatial position. For example, the climate control stretch 2 itself, an auxiliary textile or a part of its surface are conceivable.

At least one temperature control device 3 advantageously comprises at least one control strand 19. The words "control strand" comprise in particular a strand-shaped structural part for charging or removing heat along the strand, in particular a heating wire or a thermal conduction tube. "Heat conduction tube" designates a tubular structural part in the interior of which a fluid can transport heat very efficiently by evaporation.

At least one control strand 19 advantageously has at least in part a diameter of 0.05 to 10 mm, in particular 0.1 to 4 mm, especially 1 to 2 mm.

In an appropriate manner at least one control strand 19 has at least in part one position that results in an efficient heating of air passing by and/or of a seat surface or hand support surface. A laying of layers along a surface to be heated or windings about a conduit is advantageous.

At least one temperature control device 3 advantageously comprises a structural part for controlling a controlling zone. This includes, in particular heating devices 4 or cooling devices 5.

At least one heating device 4 advantageously comprises at least one heat source 18. The concept "heat source" means, in particular an electrical resistor whose thermal energy emitted during the flowthrough of current serves directly or indirectly to heat a climate regulation stretch. For example, single-wire or multi-wire conductor strands with individual strands that are insulated at least in part from one another, for example, lacquer-insulated wires with a copper and/or steel component. However, even Peltier elements or heat conduction tubes can be considered.

At least one heat source 18 advantageously consists at least in part of an electrically conductive material. Insulated or non-insulated wire strands or hardened conductive paste are cited as examples.

At least one cooling device 5 advantageously comprises at least one heat sink 55. The concept "heat sink" means, in particular a Peltier element or a heal conduction tube whose thermal energy serves directly or indirectly for heating a climate control stretch.

A temperature control device 3 advantageously comprises at least one temperature detector 7 and/or a thermal switch 16. The designation "thermal switch" means, in particular a device that on the one hand, has a temperature detector 7 in order to detect when certain temperature values are exceeded or dropped below and on the other hand, has a switching device 8 in order to switch the operating state and/or an electric current from a first to a second operating state as a function of determined temperature values. This permits a suppression of an inadmissible heating or cooling and permits an operation of a temperature control device at a level comfortable for an individual user. For example, an NTC or a thermostat is suitable.

A thermal switch 6 preferably comprises at least one sensor temperature control device 9. The words "sensor temperature control device" comprise in particular an additional heating 12 with at least one second heating part 25 in order to heat the thermal switch 6 and the temperature detector 7 selectively independently and additionally to the regular heat sources 1. This brings about a behavior of the temperature detector 7 and of the thermal switch 6 as if the theoretical temperature of the temperature control device had already on the whole attained the theoretical temperature. This brings about a "premature" turning off, that is, in the end, a regulating of the heating device 4 to a lower theoretical temperature. In particular, heating parts 25 are advantageous, that have the same construction as the heat sources 18 that are provided in any case in the electrical heating device 4.

It can be especially advantageous if the additional heating 12 remains turned off in a heating stage with high heating performance, for example, at a theoretical temperature of 37° C. This favors a traditional operation of the heating device 4 and a turning off of a heating current upon the attaining of the theoretical temperature, for example, in that the temperature detector 7 is designed as an NTC/thermostat or as a part of it.

It is preferable if the sensor temperature control device 9 is cut in addition to the regular heat sources 18 in another heating stage with a lower theoretical heating performance, for example, at a theoretical temperature of 28° C. As a result of the additional heating of the thermal switch 6 or of the temperature detector 7 it always heats up faster than the total surface heated by the electrical heating device 4. Since this is the case at every switching cycle, the heating device 4 is regulated in the end in this operating mode at a temperature level that is lower than the actual theoretical temperature of the thermal switch 6.

It can be advisable that an additional heating 12 has a metallic wire, in particular with copper and/or silver and/or carbon fibers.

However, the concept "sensor temperature control device" can also refer to an additional cooling device 50 in order to cool the sensor selectively independently and additionally to a regular cooling device. Among others, heat conduction tubes or Peltier elements analogous to the regular cooling elements provided in any case in the cooling device 5 can be considered. This brings about a behavior of the thermal switch 16 and of the temperature detector 7 as if the theoretical temperature of the temperature control device 3 had on the whole attained the theoretical temperature only at a later point in time. Since this is the case in every switching cycle, the cooling device 5 is regulated in the end in this operating mode to a temperature level that is higher than the actual theoretical temperature of the thermal switch 6.

The invention claimed is:

1. A temperature control device comprising:
  a. at least one heat source heating the temperature control device;
  b. at least one temperature detector for monitoring a temperature of the temperature control device, the at least one temperature detector being heated by the at least one heat source; and
  c. a sensor temperature control device having a heating part;
  wherein the heating part is configured to be selectably switched on in order to additionally heat the at least one temperature detector independently of the at least one heat source at least in some operating stages,
  wherein the heating part is selectively switched on and the at least one temperature detector is independently and additionally heated such that a theoretical temperature of the temperature control device detected by the at least one temperature detector is reached before the theoretical temperature has actually been reached so that the at least one heat source is lowered or turned off before the theoretical temperature is reached, and
  wherein when the heating part is selectively switched on and the at least one temperature detector is independently and additionally heated, an operating temperature of the at least one heat source is lower than an operating temperature of the at least one heat source when the heating part is not switched on.

2. The temperature control device according to claim 1, wherein the temperature control device comprises a cooling device in order to cool a controlling zone,
  wherein the sensor temperature control device comprises an additional cooling device that can be selectably switched on in addition to the cooling device in order to independently and additionally cool the at least one temperature detector,
  wherein the additional cooling device is selectively switched on and the at least one temperature detector is independently and additionally cooled such that a second theoretical temperature of the temperature control device detected by the at least one temperature detector is reached before the second theoretical temperature has actually been reached so that the cooling device is regulated or turned off before the second theoretical temperature is actually reached, and
  wherein when the additional cooling device is selectively switched on and the at least one temperature detector is independently and additionally cooled, an operating temperature of the cooling device is higher than an operating temperature of the cooling device when the additional cooling device is not switched on.

3. The temperature control device according to claim 1, wherein the at least one temperature control device comprises a controlling strand that is laid close to a surface under a covering.

4. The temperature control device according to claim 1, wherein the at least one temperature detector is a thermostat or a part of one.

5. A seat comprising: at least one of the temperature control devices in accordance with claim 1.

6. A vehicle comprising: at least one of the temperature control devices in accordance with claim 1.

7. The temperature control device according to claim 1, wherein the at least one temperature detector is a thermostat or a part of one.

8. A method for operating the temperature control device of claim 1, wherein the method comprises the steps of:
operating the at least one heat source or a cooling device in a first operating stage;
monitoring a temperature of the at least one heat source or the cooling; device using the at least one temperature detector; and
switching on the sensor temperature control device in a second operating stage and adjusting an operating temperature on the temperature control device and/or on the at least one temperature detector before the theoretical temperature is reached.

9. A method comprising:
operating a temperature control device with as temperature detector having at least two different temperature stages, the operating step comprising:
a. operating a heat source or a cooling device in a first operating stage;
b. monitoring a temperature of the heat source or the cooling device using the temperature detector; and
c. selectively switching on a sensor temperature control device in a second operating stage and additionally and independently changing a temperature on the temperature control device such that a theoretical temperature of the temperature control device detected by the temperature detector is reached before the theoretical temperature has actually been reached,
wherein the step of selectively switching on the sensor temperature control device includes independently and additionally heating the temperature detector with an additional heating part so that an operating temperature of the beat source is lower than an operating temperature of the heat source when the sensor temperature control device is not switched on, and/or
wherein the step of selectively switching on the sensor temperature control device includes independently and additionally cooling the temperature detector with the additional cooling device so that an operating temperature of the cooling device is higher than an operating temperature of the cooling device when the sensor temperature control device is not switched on.

10. The temperature control device of claim 1, wherein the at least one heat source comprises an electrical resistor comprising a single-wire or multi-wire conductor strand with individual strands that are insulated at least in part from one another.

11. The temperature control device of claim 2, wherein the cooling device comprises a heat sink.

12. The temperature control device of claim 1, wherein the theoretical temperature is between 28° C. and about 37 °C.

13. The method of claim 8,
wherein the step of switching on the sensor temperature control device includes heating the temperature detector with the beating part in addition to the at least one heat source so that the operating temperature of the at least one heat source is lower than the operating temperature of the at least one heat source when the temperature detector is not additionally heated.

14. The method of claim 8, wherein the sensor temperature control device comprises an additional cooling device,
wherein the step of switching on the sensor temperature control device includes cooling the temperature detector with the additional cooling device in addition to the cooling device so that an operating temperature of the cooling device is higher than an operating temperature of the cooling device when the temperature detector is not additionally cooled.

15. A seat for a vehicle comprising at least one of the temperature control devices of claim 9.

16. The method of claim 9, wherein the heat source comprises an electrical resistor comprising a single-wire or multi-wire conductor strand with individual strands that are insulated at least in part from one another, and
wherein the cooling device comprises a heat sink.

17. A temperature control device comprising:
a. a cooling device;
b. at least one temperature detector for monitoring a temperature of the temperature control device, the temperature detector being cooled by the cooling device; and
c. a sensor temperature control device;
wherein the sensor temperature control device comprises an additional cooling device that can be selectably switched on in order to independently and additionally cool the at least one temperature detector, and
wherein the additional cooling device is selectively switched on and the at least one temperature detector is independently and additionally cooled such that a theoretical temperature of the temperature control device detected by the at least one temperature detector is reached before the theoretical temperature of the temperature control device has actually been reached so that the cooling device can be regulated.

18. The temperature control device of claim 17, wherein the temperature control device comprises a heat source for heating the at least one temperature detector, and the sensor temperature control device comprises a heating part that can be selectably switched on in order to independently and additionally heat the at least one temperature detector, and
wherein the heating part is selectively switched on and the at least one temperature detector is independently and additionally heated such that a second theoretical temperature of the temperature control device detected by the at least one temperature detector is reached before the second theoretical temperature has actually been actually reached so that the heat source is lowered or turned off before the second theoretical temperature is actually reached.

19. A seat for a vehicle comprising at least one of the temperature control devices of claim 18.

20. The temperature control device of claim 18, wherein when the additional cooling device is switched on and the at least one temperature detector is additionally cooled, an operating temperature of the cooling device is higher than an operating temperature of the cooling device when the additional cooling device is not switched on, and
wherein when the heating part is switched on and the at least one temperature detector is additionally heated, an operating temperature of the heat source is lower than an operating temperature of the heat source when the heating part is not switched on.

* * * * *